(12) United States Patent
Payne

(10) Patent No.: US 9,227,464 B2
(45) Date of Patent: Jan. 5, 2016

(54) AXLE ASSEMBLY FOR A WORK VEHICLE

(71) Applicant: CNH Industrial America, LLC, New Holland, PA (US)

(72) Inventor: Daniel Payne, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/291,182

(22) Filed: May 30, 2014

(65) Prior Publication Data

US 2015/0343842 A1 Dec. 3, 2015

(51) Int. Cl.
*B60B 27/06* (2006.01)
*B62D 49/00* (2006.01)
*B62D 49/06* (2006.01)

(52) U.S. Cl.
CPC .............. *B60B 27/065* (2013.01); *B62D 49/00* (2013.01); *B62D 49/0678* (2013.01)

(58) Field of Classification Search
CPC ... B60B 27/065; B62D 49/0678; B62D 49/00
See application file for complete search history.

(56) References Cited

U.S. PATENT DOCUMENTS

| | | | |
|---|---|---|---|
| 2,374,207 A | 11/1943 | Jackson | |
| 3,033,597 A * | 5/1962 | Miller | 403/15 |
| 3,104,459 A * | 9/1963 | Wendt | 29/252 |
| 3,612,582 A | 10/1971 | Pitner | |
| 3,795,294 A * | 3/1974 | Pearson | 192/85.21 |
| 4,285,528 A | 8/1981 | Neamtu | |
| 4,422,795 A | 12/1983 | Berrange | |
| 4,456,396 A | 6/1984 | Damratowski | |
| 4,525,095 A | 6/1985 | Lamb et al. | |
| 4,925,415 A | 5/1990 | Sutcliffe | |
| 4,936,634 A * | 6/1990 | Stratton et al. | 301/128 |
| 5,306,093 A * | 4/1994 | Elbert | 403/259 |
| 5,624,016 A | 4/1997 | Coulter et al. | |
| 6,299,259 B1 * | 10/2001 | MacKarvich | 301/127 |
| 6,431,654 B1 | 8/2002 | LeBegue | |
| 8,360,677 B2 * | 1/2013 | Yamashita et al. | 403/359.6 |
| 8,449,215 B2 | 5/2013 | Lissy | |
| 2003/0020324 A1 * | 1/2003 | Radke et al. | 301/128 |

FOREIGN PATENT DOCUMENTS

| | | |
|---|---|---|
| CH | 700970 | 11/2010 |
| GB | 810498 | 3/1959 |

OTHER PUBLICATIONS

US Statutory Invention Registration, Inventor: Appleman Reg No. H1647.

* cited by examiner

*Primary Examiner* — Drew Brown
(74) *Attorney, Agent, or Firm* — Sue C. Watson

(57) ABSTRACT

An axle assembly for a work vehicle may generally include a hub, a casing at least partially received within the hub, and a shaft configured to be received within the casing. The hub defines a tapered inner surface and the casing defines a tapered outer surface. The tapered inner surface of the hub defines a first keyway portion defining a first keyway surface, and the tapered outer surface of the casing defines a second keyway portion defining a second keyway surface. The tapered surfaces of the hub and the casing together define a tapered interface and a keyway. The first and second keyway surfaces of the keyway extend in a direction non-parallel to the tapered interface.

18 Claims, 5 Drawing Sheets

AXLE ASSEMBLY FOR A WORK VEHICLE

FIELD OF THE INVENTION

The present disclosure generally relates to a keyed connection for a hub of an axle assembly, or more particularly, to a keyed connection for a hub and casing of an axle assembly for a work vehicle.

BACKGROUND OF THE INVENTION

Off-highway work vehicles, such as tractors, have been developed for a myriad of different purposes and are generally known to include a drivetrain sufficient to deliver a high amount of power and torque to one or more drive wheels. Typical drivetrains for a work vehicle include an engine, a transmission or gearbox, and a final drive reduction assembly. The final drive reduction assembly includes a bar axle that functions to transfer the rotational power generated by the drivetrain to the drive wheel(s), which is typically accomplished using a hub configured to establish a connection between the bar axle and the drive wheel(s).

The bar axle and hub connection may additionally include an intermediate casing to facilitate an attachment between the two parts. The casing typically includes a cylindrical opening corresponding in size and shape to the bar axle and a tapered outer surface. The tapered outer surface is received within an opening of the hub and creates a friction joint with a tapered inner surface of the hub. The casing may be pressed into and attached to the hub using a plurality of bolts. Such a configuration additionally creates a friction joint between the casing and the bar axle.

The friction joints allow for rotational force to be transferred from the axle through the casing, through the hub, and to the drive wheel(s). In order to increase the amount of rotational force that may be transferred, keys may be positioned in respective keyways defined between the bar axle and the hub, and between the hub and the casing. With respect to the friction joint between the casing and the hub, the keyway is known to be defined in a direction parallel to the tapered surfaces of the hub and casing. However, certain problems may exist with such a configuration. For example, with such a configuration, a cross-sectional thickness of the casing below the keyway may not be sufficient to transfer a desired amount of rotational force or torque to the hub from the bar axle. Additionally, such a configuration may be susceptible to a yielding of the keyway walls.

Accordingly, a keyway configuration for the casing designed to withstand an increased amount of force without yielding would be useful.

BRIEF DESCRIPTION OF THE INVENTION

Aspects and advantages of the invention are set forth below in the following description, or may be obvious from the description, or may be learned through practice of the invention.

In one exemplary embodiment, an axle assembly for a work vehicle is provided, the axle assembly including a hub defining a tapered inner surface and a first keyway portion. The first keyway portion defined by the hub extends radially outwardly from the tapered inner surface and defines a first keyway surface. The axle assembly also includes a casing at least partially received within the hub, the casing defining a tapered outer surface and a second keyway portion. The second keyway portion defined by the casing extends radially inwardly from the tapered inner surface and defines a second keyway surface. The tapered outer surface of the casing extends parallel to the tapered inner surface of the hub and is configured to contact the tapered inner surface of the hub such that a tapered interface is defined between the casing and the hub. Additionally, the first and second keyway portions are configured to be circumferentially aligned such that a keyway is defined between the first and second keyway surfaces. The axle assembly further includes a shaft configured to be received within the casing and a key received within the keyway. The shaft defines a central axis and the tapered interface extends non-parallel to the central axis. Additionally, the first and second keyway surfaces extend in a direction non-parallel to the tapered interface.

In another exemplary embodiment, a work vehicle is provided, the work vehicle including a hub defining a tapered inner surface and a first keyway portion. The first keyway portion defined by the hub extends radially outwardly from the tapered inner surface and defines a first keyway surface. The work vehicle also includes a casing at least partially received within the hub, the casing defining a tapered outer surface and a second keyway portion. The second keyway portion defined by the casing extends radially inwardly from the tapered inner surface and defines a second keyway surface. The tapered outer surface of the casing extends parallel to the tapered inner surface of the hub and is configured to contact the tapered inner surface of the hub such that a tapered interface is defined between the casing and the hub. Additionally, the first and second keyway portions are configured to be circumferentially aligned such that a keyway is defined between the first and second keyway surfaces. The work vehicle also includes an axle in mechanical communication with an engine and a transmission of the work vehicle and a key received within the keyway. The axle includes a shaft and the shaft is configured to be received within the casing. The shaft defines a central axis and the tapered interface extends non-parallel to the central axis. Additionally, the first and second keyway surfaces extend in a direction non-parallel to the tapered interface.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
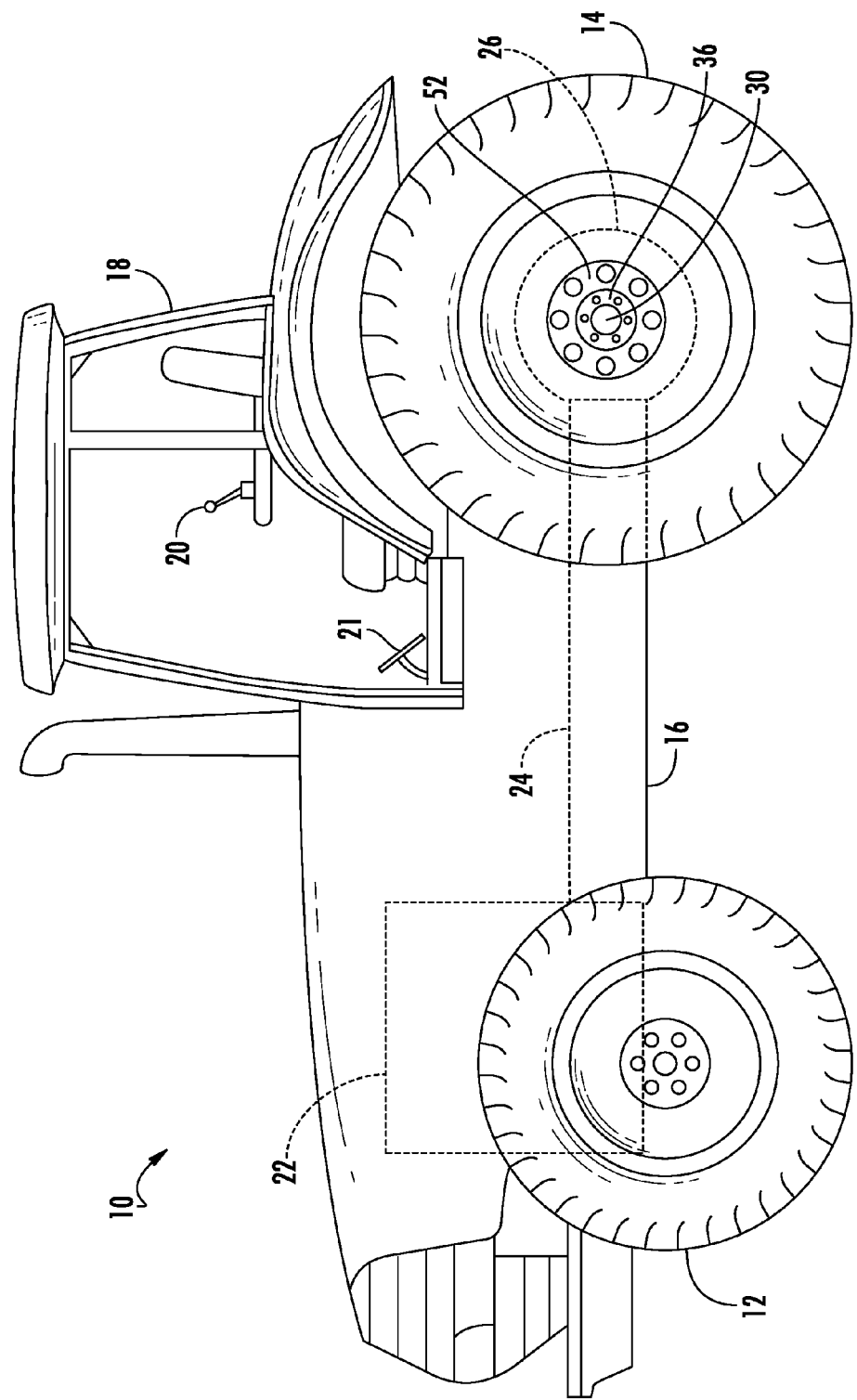
FIG. 1 is a side view of a work vehicle in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an axle assembly including a keyed connection between a casing and a hub. More specifically, the present disclosure is directed to an axle assembly for a work vehicle including a hub, a casing at least partially received within the hub, and a shaft configured to be received within the casing. The hub defines a tapered inner surface and the casing defines a tapered outer surface. The tapered inner surface of the hub defines a first keyway portion defining a first keyway surface, and the tapered outer surface of the casing defines a second keyway portion defining a second keyway surface. The tapered surfaces of the hub and the casing together define a tapered interface and a keyway. The first and second keyway surfaces of the keyway extend in a direction non-parallel to the tapered interface.

Referring now to the drawings, wherein identical numerals indicate the same elements throughout the figures, FIG. 1 provides a work vehicle 10 including a pair of front wheels 12, a pair or rear wheels 14, and a chassis 16 coupled to and supported by the Wheels 12, 14. An operator's cab 18 is supported by a portion of the chassis 16 and houses various control devices 20, 21 (e.g., levers, pedals, control panels and/or the like) for permitting an operator to control the operation of the work vehicle 10. Additionally, the work vehicle 10 includes an engine 22 and a transmission 24 mounted on the chassis 16. The transmission 24 is operably coupled to and in mechanical communication with the engine 22 and provides variably adjusted gear ratios for transferring engine power to the wheels 14 via a differential 26 and axle assembly 28 (see FIG. 2).

However, it should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis 16 may be provided to which the engine 22, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
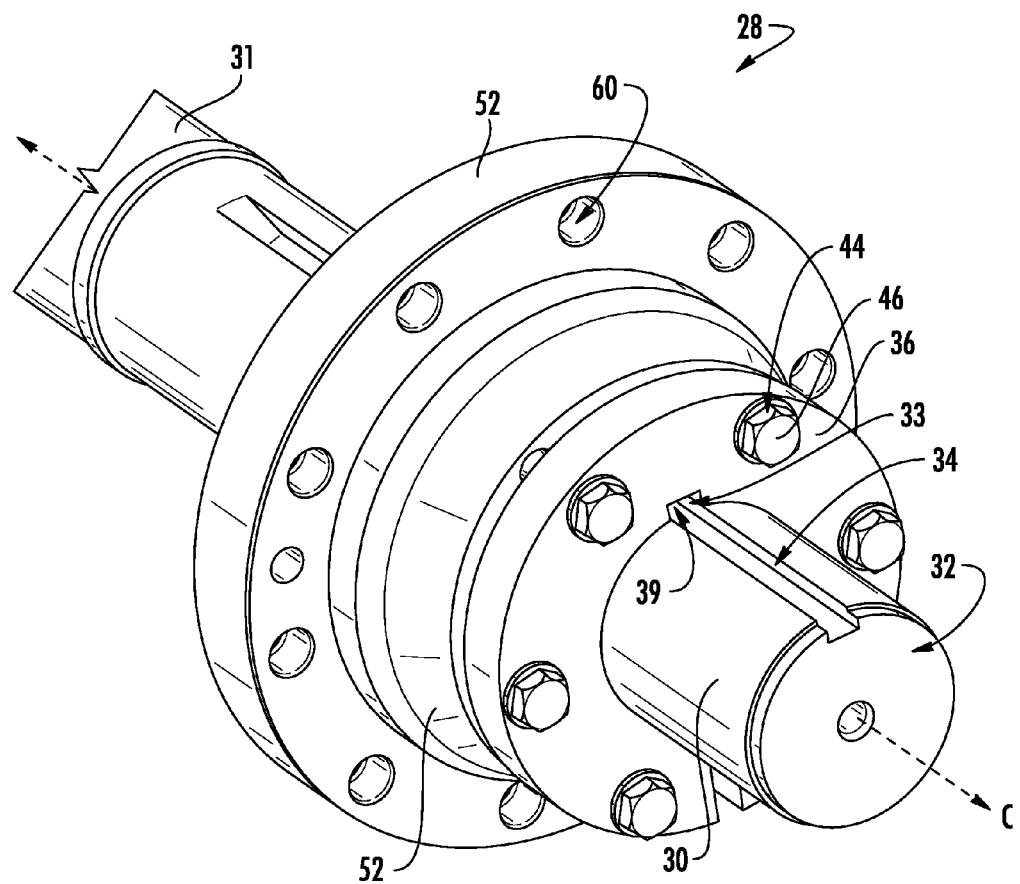
FIG. 2 is a perspective view of an axle assembly in accordance with an exemplary embodiment of the present disclosure.
Figure 3:
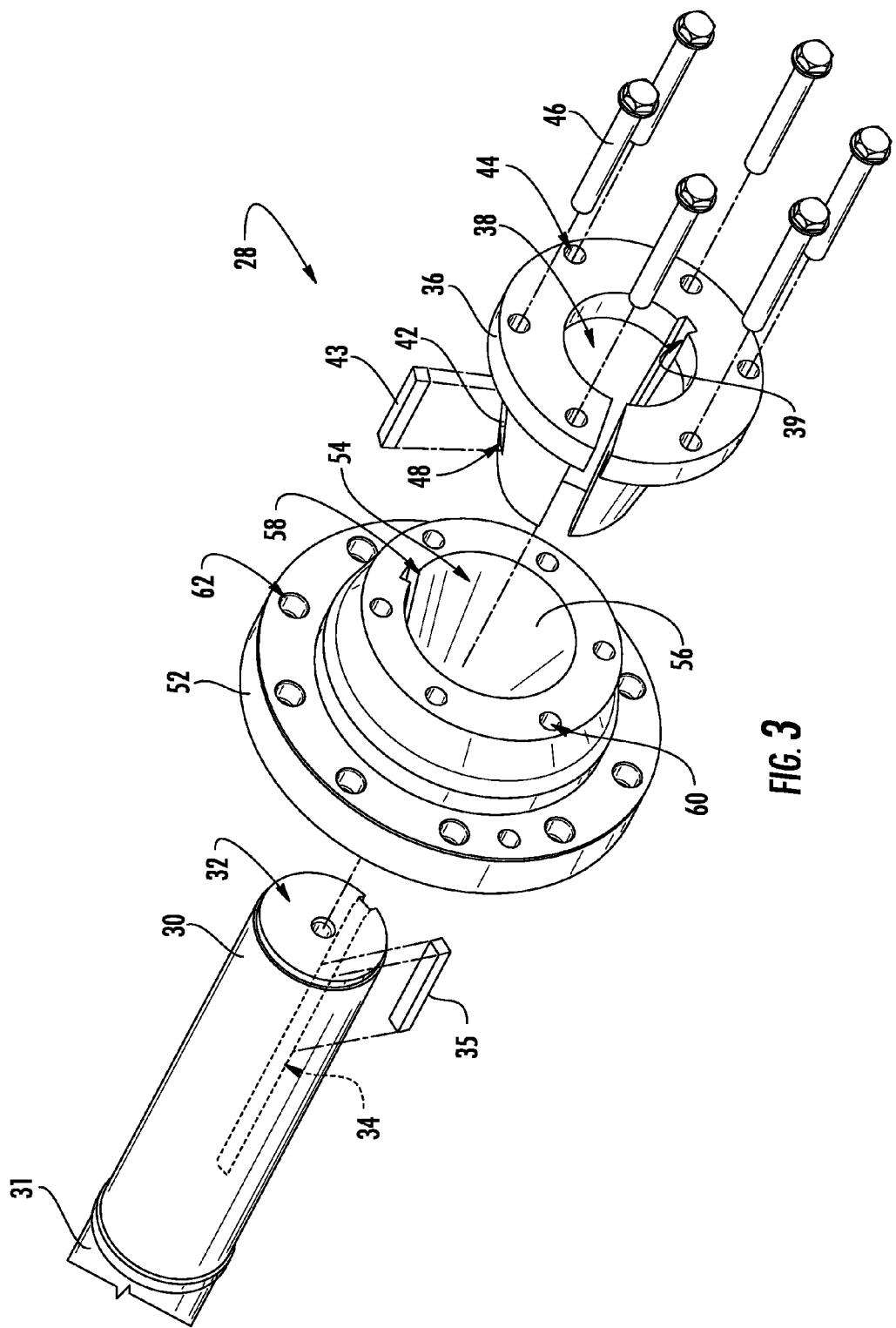
FIG. 3 is an exploded perspective view of the axle assembly of FIG. 2.

Referring now to FIGS. 2 and 3 a perspective view and an exploded view, respectively, are provided of a portion of an axle assembly 28 in accordance with the present disclosure. The axle assembly 28 may be configured to receive rotational force from the engine 22, through the transmission 24 and differential 26, and transfer such force to, for example, one or both of the rear wheels 14 of the work vehicle 10. As depicted, the axle assembly 28 generally includes a huh 52, a casing 36 at least partially received in the hub 52, and an axle 31. The axle 31 includes a shaft 30 defining a central axis C, the shaft 30 is configured to be received within and/or extend through an opening 38 in the casing 36.

The hub 52 includes a plurality of attachment points 62 for attachment to a wheel of the work vehicle 10 (FIG. 1). The casing 36, in turn, establishes the connection between the hub 52 and the shaft 30. The casing 36, which for the embodiment of FIGS. 2 and 3 is sometimes referred to as a bushing, is attached to the hub 52 using a plurality of bolts 46. The bolts 46 extend through attachment points 44 in the casing 36 and attachment points 60 in the hub 52. As will be described in greater detail below, with reference to FIG. 4, such a configuration may create a clamping or friction joint between the shaft 30 and the casing 36 and between the casing 36 and the hub 52.

The shaft 30 and the casing 36 together define a keyway 33 with a key 35 positioned therein. More particularly, the shaft 30 defines a keyway portion 34 extending radially inwardly relative to the central axis C along a length of the shaft 30, and the casing 36 defines a keyway portion 39 extending radially outwardly relative to the central axis C. The keyway portion 39 in the casing 36 extends along a length of the opening 38 (FIG. 3). The key 35 is positioned in the keyway 33 defined by the keyway portions 34, 39 of the shaft 30 and the casing 36, respectively. Such a configuration may allow for a greater amount of rotational force and/or torque to be transferred between the shaft 30 and the casing 36.

Referring still to FIGS. 2 and 3, the shaft 30 and the opening 38 of the casing 36 each define a substantially cylindrical shape. Accordingly, for the embodiment of FIGS. 2 and 3, the axle 31 is a bar axle. As used herein, the term "bar axle" refers to an axle 31 allowing for the hub 52 and/or the casing 36 to be attached at various locations along a length of the shaft 30. Such a configuration may allow for tires 14 of varying widths and tread patterns to be used with the work vehicle 10.

It should be appreciated, however, that the exemplary axle assembly 28 depicted in FIGS. 2 and 3 may, in other exemplary embodiments, have any other suitable configuration. For example, in other exemplary embodiments the axle assembly 28 may not define the keyway 39 between the casing 36 and the shaft 30. Moreover, in still other exemplary embodiments, the axle 31 may not be a bar axle, and instead may be any other axle configuration including a shaft 30, a casing 36, and a hub 52. For example, in other exemplary embodiments, the casing 36 and hub 52 may not be configured for attachment at various locations along a length of the shaft 30, and instead the casing 36 may be permanently attached to or made integrally with the shaft 30 and axle 31. Furthermore, in other exemplary embodiments, the shaft 30 of the axle 31 and the opening 38 of the casing 36 may not define a substantially cylindrical shape, and instead may define any other suitable shape.

Figure 4:
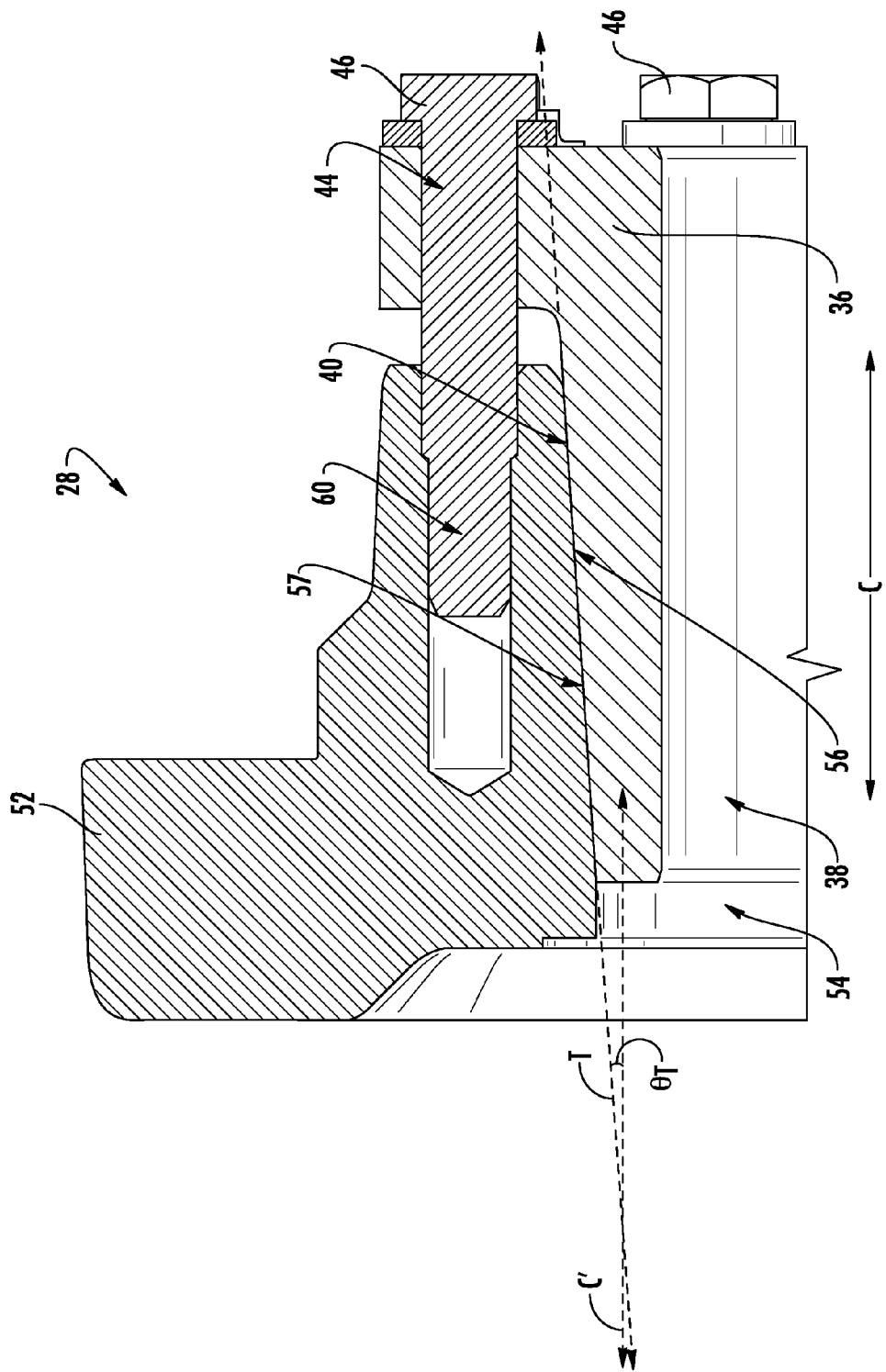
FIG. 4 is a cross-sectional side view of a portion of the axle assembly of FIG. 2.

With reference now to FIG. 4, a cross-sectional view of a portion of the axle assembly 28 is shown in greater detail. As shown, the hub 52 defines an opening 54 and a tapered inner surface 56. The casing 36 is received at least partially in the opening 54. More particularly, the casing 36 defines a tapered outer surface 40 having a frustoconical shape configured to contact the correspondingly shaped opening 54 and tapered inner surface 56 of the hub 52. The tapered outer surface 40 of the casing 36 and the tapered inner surface 56 of the hub 52 together define a tapered interface 57 extending in a direction 'T'. As shown in FIG. 4, the tapered interface 57 extends non-parallel to the central axis C, such that the direction T of the tapered interface 57 defines an angle $\theta_T$ relative to the central axis C that is greater than zero (as indicated by line C', extending parallel to the central axis C). The tapered interface 57 creates a clamping/friction joint between the hub 52 and the casing 36 that increases in strength as the bolts 46 are tightened and the casing 36 is moved closer to the hub 52 along the central axis C. Similarly, the tapered interface 57 creates a clamping/friction joint between the casing 36 and the shaft 30 of the axle 31 that also increases in strength as the bolts 46 are tightened and the casing 36 is moved closer to the hub 52 along the central axis C. For the embodiment of FIG. 4, the bolts 46 are depicted extending in a direction substantially parallel to the central axis C.

Figure 5:
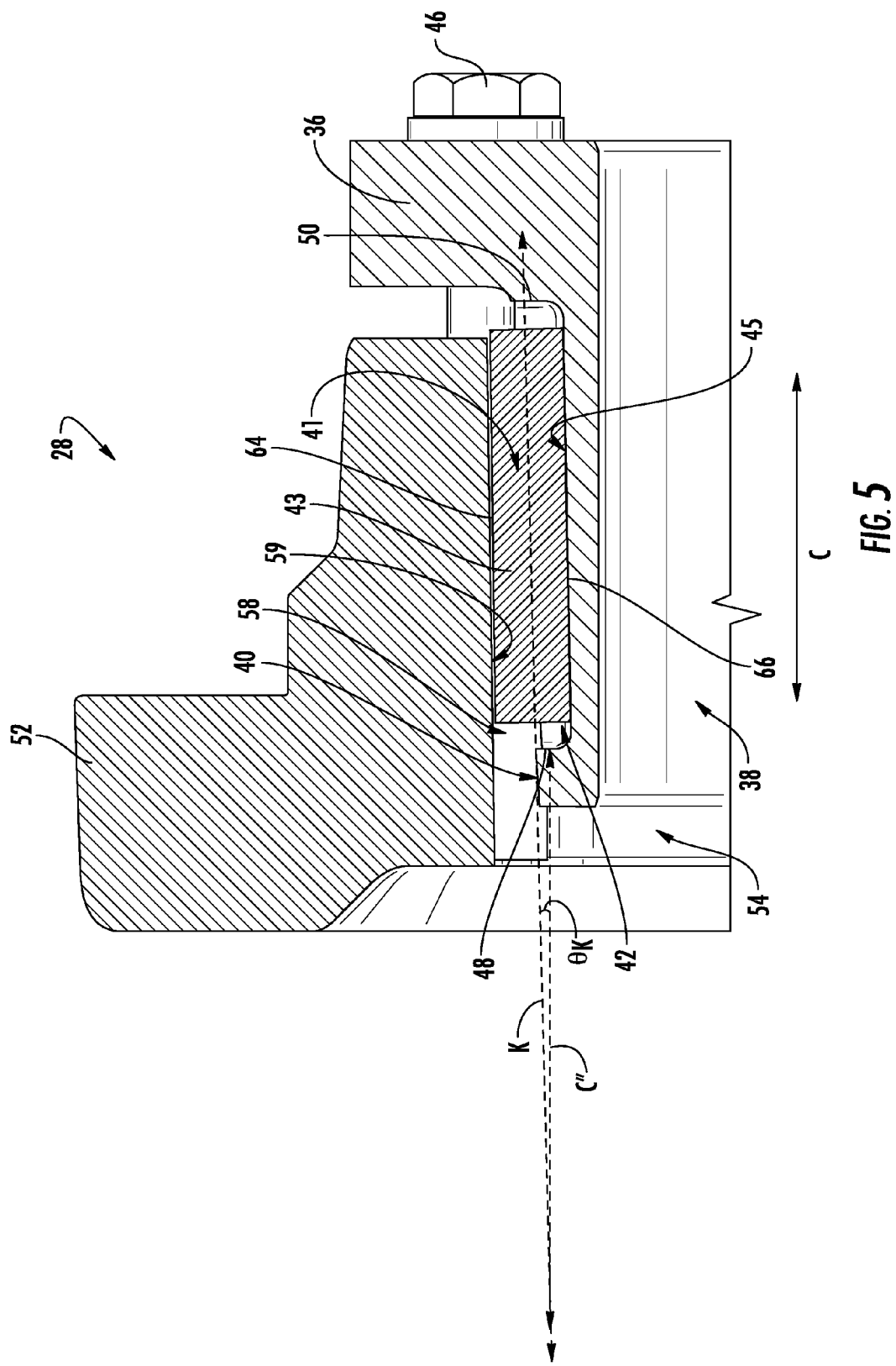
FIG. 5 is a cross-sectional side view of another portion of the axle assembly of FIG. 2 depicting a keyway and key in accordance with an exemplary embodiment of the present disclosure.

With reference now to FIG. 5, a cross-sectional view of another portion of the axle assembly 28 is provided, depicting an exemplary keyed connection between the hub 52 and casing 36 configured to further increase the strength of the friction joint at the tapered interface 57.

As depicted in FIG. 5, the hub 52 additionally defines a first keyway portion 58 extending radially outwardly from the tapered inner surface 56 (see FIG. 4) with respect to the central axis C. Additionally, the casing 36 defines a second keyway portion 42 extending radially inwardly from the tapered outer surface 40 with respect to the central axis C. The first keyway portion 58 defines a first keyway surface 59 and the second keyway portion 42 defines a second keyway surface 45. The second keyway portion 42 further defines a pair of opposing end walls 48, 50 positioned at opposite longitudinal ends of the second keyway portion 42 along the central axis C. The first and second keyway portions 58, 42 are configured to be circumferentially aligned when the casing 36 is received within the hub 52 such that a keyway 41 is defined between the first and second keyway surfaces 59, 45. A key 43 is received within the keyway 41, which for the embodiment of FIG. 5 is a parallel key having a rectangular cross-sectional shape and defining substantially parallel opposing walls 64, 66. As used herein, parallel key refers to a key with substantially parallel opposing walls.

Referring still to FIG. 5, the first and second keyway surfaces 59, 45 extend parallel to each other and in a direction K that is non-parallel to the tapered interface 57. More particularly, the direction K of the first and second keyway surfaces 59, 45 defines an angle $\theta_K$ relative to the central axis C (as indicated by the line C''', extending parallel to the central axis C) that is less than the angle $\theta_T$ of the tapered interface 57 relative to the central axis C (FIG. 4). The keyway 41 of FIG. 5 between the hub 52 and the casing 36 may increase an amount of force the keyway 41 and key 43 are capable of withstanding prior to yielding by providing a larger contact surface area at opposite ends of the keyway 41. For example, the first wall 48 defines a height in the radial direction that is less than a height of the second wall 50 defined in the radial direction. Accordingly, in the exemplary embodiment of FIG. 5, the key 43 contacts more of the first keyway portion 58 than the second keyway portion 42 proximate to the first wall 48 of the second keyway portion 42, and the key 43 contacts more of the second keyway portion 42 than the first keyway portion 58 proximate to the second wall 50 of the second keyway portion 42. An axle assembly 28 having such a configuration may provide a connection capable of transmitting an increased amount of rotational force and/or torque than prior configurations.

Additionally, for the exemplary embodiment of FIG. 5, the first and second keyway surfaces 59, 45 extend in a direction K that is also non-parallel to the central axis C. More particularly, the direction K of the first and second keyway surfaces 59, 45 defines an angle $\theta_K$ greater than zero relative to the central axis C. Such a configuration may allow for an area of greater thickness of the casing 36 between the second keyway surface 45 and the opening 38. For example, as depicted in FIG. 5, the thickness of the casing 36 between the keyway 42 and the opening 38, adjacent to the second wall 50, is greater than it otherwise would have been if the direction K were parallel to the central axis C. Such a configuration may allow the casing 36 to transfer an increased amount of rotational force between the hub 52 and the axle 31. Moreover, by defining the keyway surfaces 45, 59 at an angle $\theta_K$ greater than zero with respect to the central axis C, the axle assembly 28 may be more easily assembled.

It should be appreciated, however, that in other exemplary embodiments of the present disclosure, the axle assembly 28 may include any other suitable construction or configuration. For example, in other exemplary embodiments, the keyway surfaces 45, 59 may extend in a direction K that is parallel to the central axis C such that the angle $\theta_K$ is equal to zero. Alternatively, the keyway surfaces 45, 59 may extend in a direction K that defines an angle $\theta_K$ that is greater than the angle $\theta_T$ defined by the tapered interface 57 with respect to the central axis C. Furthermore, although the key 43 is configured as a parallel key, in other exemplary embodiments, the keyway 41 and key 43 may have any other suitable non-parallel shape.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. An axle assembly for a work vehicle comprising:
    a hub defining a tapered inner surface and a first keyway portion extending radially outwardly from the tapered inner surface, the first keyway portion defining a first keyway surface;
    a casing at least partially received within the hub, the casing defining a tapered outer surface and a second keyway portion, the second keyway portion extending radially inwardly from the tapered outer surface and defining a second keyway surface, the tapered outer surface extending parallel to the tapered inner surface and being configured to contact the tapered inner surface such that a tapered interface is defined between the casing and the hub, the first and second keyway portions configured to be circumferentially aligned such that a keyway is defined between the first and second keyway surfaces;
    a shaft configured to be received within the casing, the shaft defining a central axis, the tapered interface extending non-parallel to the central axis; and
    a key received within the keyway;
    wherein the first and second keyway surfaces extend in a direction non-parallel to the tapered interface, and
    wherein the shaft and the casing together define a keyway with a key positioned therein.

2. The axle assembly of claim 1, wherein the first and second keyway surfaces extend in a direction non-parallel to the central axis.

3. The axle assembly of claim 2, wherein the first and second keyway surfaces define a first angle greater than zero relative to the central axis, wherein the tapered interface defines a second angle relative to the central axis, wherein the first angle is less than the second angle.

4. The axle assembly of claim 1, wherein the key is a parallel key having substantially parallel opposing walls.

5. The axle assembly of claim 1, wherein the casing is attached to the hub using a plurality of bolts extending in a direction substantially parallel to the central axis.

6. The axle assembly of claim 1, wherein second keyway portion further defines a first wall and a second wall at opposite longitudinal ends of the second keyway surface.

7. The axle assembly of claim 1, wherein the tapered outer surface of the casing defines a frustoconical shape.

8. The axle assembly of claim 1, wherein the shaft is a component of a bar axle of the work vehicle.

9. The axle assembly of claim 1, wherein the casing and the hub are attachable to the shaft at various locations along a length of the shaft.

10. The axle assembly of claim 1, wherein the hub is configured for attachment to a wheel of the work vehicle.

11. A work vehicle comprising:
    an engine;
    a transmission in mechanical communication with the engine; and
    an axle assembly in mechanical communication with the transmission, the axle assembly comprising
        a hub defining a tapered inner surface and a first keyway portion extending radially outwardly from the tapered inner surface, the first keyway portion defining a first keyway surface;
        a casing at least partially received within the hub, the casing defining a tapered outer surface and a second keyway portion, the second keyway portion extending radially inwardly from the tapered outer surface and defining a second keyway surface, the tapered outer surface extending parallel to the tapered inner surface and configured to contact the tapered inner surface such that a tapered interface is defined between the casing and the hub, the first and second keyway portions configured to be circumferentially aligned such that a keyway is defined between the first and second keyway surfaces;
        an axle in mechanical communication with an engine and a transmission of the work vehicle and comprising a shaft, the shaft configured to be received within the casing, the shaft defining a central axis, the tapered interface extending non-parallel to the central axis; and
        a key received within the keyway;
        wherein the first and second keyway surfaces extend in a direction non-parallel to the tapered interface, and
    wherein the shaft and the casing together define a keyway with a key positioned therein.

12. The work vehicle of claim 11, wherein the first and second keyway surfaces extend in a direction non-parallel to the central axis.

13. The work vehicle of claim 12, wherein the first and second keyway surfaces define a first angle greater than zero relative to the central axis, wherein the tapered interface defines a second angle relative to the central axis, wherein the first angle is less than the second angle.

14. The work vehicle of claim 11, wherein the casing is a bushing attached to the hub using a plurality of bolts extending in a direction substantially parallel to the central axis.

15. The work vehicle of claim 11, wherein second keyway portion further defines a first wall and a second wall at opposite longitudinal ends of the second keyway surface.

16. The work vehicle of claim 11, wherein the axle is a bar axle.

17. The work vehicle of claim 11, wherein the hub is attached to a wheel of the work vehicle.

18. The work vehicle of claim 11, wherein the shaft of the axle is rotatably driven by the engine of the work vehicle.

\* \* \* \* \*